(No Model.) 2 Sheets—Sheet 1.

J. C. SIMPSON.
BLIND BRIDLE.

No. 261,773. Patented July 25, 1882.

Witnesses:
Geo. H. Strong
S. H. Nourse

Inventor:
J. C. Simpson
By Dewey & Co.
Attorney (No Model.) 2 Sheets—Sheet 2.

J. C. SIMPSON.
BLIND BRIDLE.

No. 261,773. Patented July 25, 1882.

UNITED STATES PATENT OFFICE.

JOSEPH C. SIMPSON, OF OAKLAND, CALIFORNIA.

BLIND-BRIDLE.

SPECIFICATION forming part of Letters Patent No. 261,773, dated July 25, 1882.

Application filed March 27, 1882. (No model.)

*To all whom it may concern:*

Be it known that I, JOSEPH C. SIMPSON, of Oakland, county of Alameda, State of California, have invented an Improved Blind-Bridle and Winkers for Race-Horses; and I hereby declare the following to be a full, clear, and exact description thereof.

My invention relates to an improved blind-bridle which is especially useful for race-horses; and it consists of peculiarly-formed blinds with supporting cheek-pieces, and a bridle having a head-pad and various adjusting-straps by which the position of the blinds may be regulated and maintained, as will be more fully explained by reference to the accompanying drawings, in which—

Figure 1:
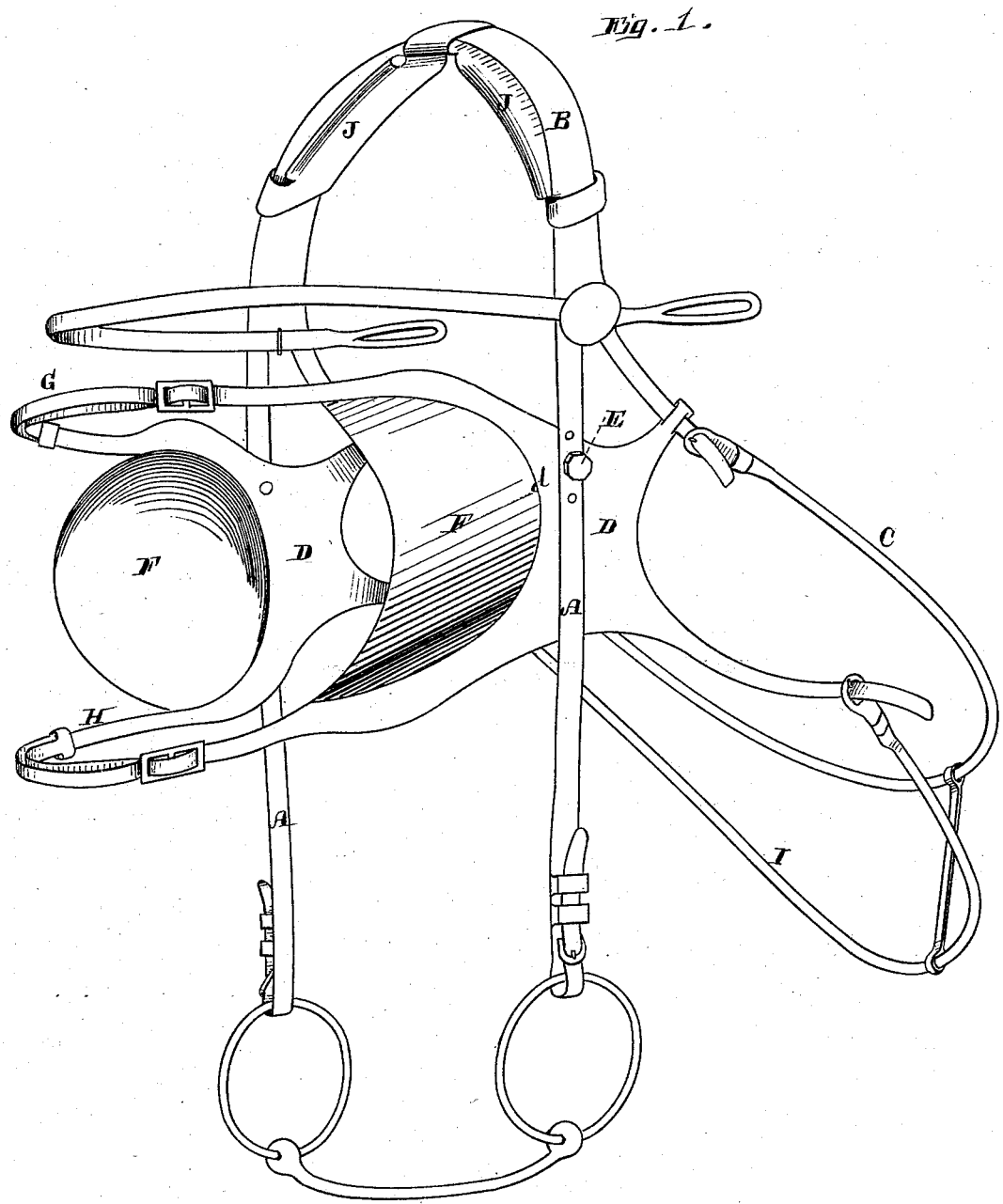
Figure 2:
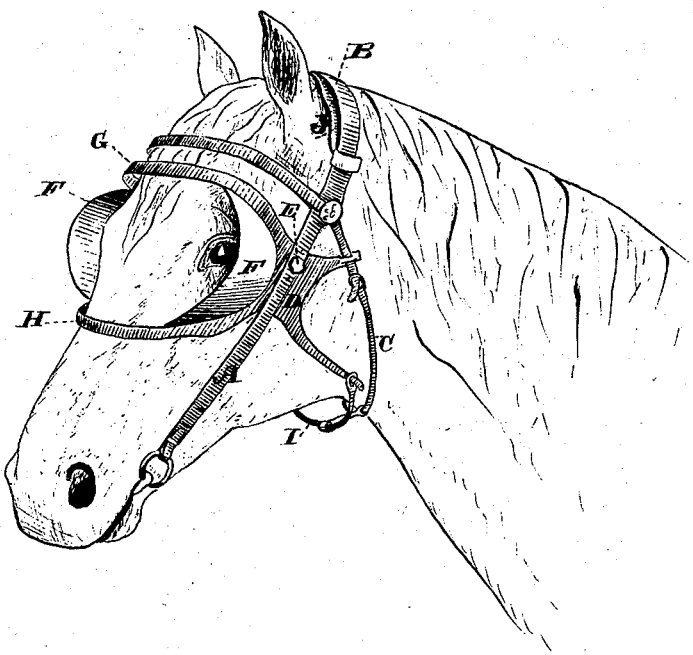

Figure 1 is a view of my invention. Fig. 2 shows its application to a horse.

My invention is designed to provide a blind-bridle which does not interfere with the functions of the eye, giving plenty of ventilation without the possibility of the blind injuring that organ, while it may at the same time be exactly adjusted, and will keep its place without a chance for disarrangement.

It thus limits the vision to any desired point, and in this manner controls the action, and its lightness is such as to be a slight incumbrance and to prevent the heating of the head caused by the ordinary blinkers.

A are the side straps, B the head-piece, and C the throat latch or lash, of an ordinary bridle.

D are extensions or cheek-pieces, which are fixed to the straps A by a screw, nut, and washer, E, as shown, thus forming a pivot attachment which gives the utmost freedom of motion and facility of adjustment, and at the same time secure fastening.

The extensions D have a semicircular or other suitably-shaped opening made at the front, as shown at *d*, for the purpose of receiving the anterior edge of the blind F, which fits and is secured into this curved opening. The blind curves outward from its attachment to the part D, having a sort of scoop shape and opening to the front, while its upper and lower edges are brought in above and below the eye, so as to limit the vision up or down, as may be desired.

From the upper front portion of the extensions D a band, G, extends across the face and has adjusting buckles or slides, and a similar band, H, extends from the lower part of the extension across the face below the eyes. From the lower rear portion of the parts D a band, I, extends around behind the jowl, while the loops of the upper extensions receive the billets of the throat latch or lash C. By means of these four bands, including the throat-latch, the blind may be adjusted to any point desired.

If the horse does not lift his feet properly, the blind may be set up so that the horse sees the ground at a distance to the front; or it may be set so as to limit the vision upward. Any adjustment may be accurately made and maintained.

The head-piece B of the bridle has its inner side fitted with a slight elastic leather pad, J, so formed as to rest upon each side of the mane and prevent the wearing of the same.

When the overdraw or side check is used it relieves the pressure upon the head, and it also keeps the bridle better in place.

Having thus described my invention, what I claim as new, and desire to secure by Letters Patent, is—

1. The part D, supported by the side straps of the bridle, extending back, as shown, the front having an opening into which the blind is fitted, substantially as herein described.

2. In a bridle, in combination with the extensions D, the curved blinds F, secured to said extensions, and as shaped, to give full freedom and ventilation to the eye while circumscribing the vision, substantially as herein described.

3. In a bridle, and in combination with the extensions D, blinds F, and side straps, A, the screw, nut, and washer E, to secure the blind and allow it to be set, substantially as herein described.

4. In a bridle, and in combination with the cheek-pieces D and blinds F, as shown, the straps or bands G and H, connecting the branches or extensions above and below the eyes, and having the adjusting slides or buckles, substantially as and for the purpose herein described.

5. In a bridle, and in combination with the blinds F, supported and pivoted to the bridle so as to be movable about their point of support, the adjustable front straps or bands, G H, and the rear band, I, and the throat latch or lash connected with the blinds, and adjustable, substantially as herein described.

In witness whereof I hereto set my hand.

JOSEPH CAIRN SIMPSON.

Witnesses:
S. H. NOURSE,
G. W. EMERSON.